(12) United States Patent
Takaki et al.

(10) Patent No.: US 11,680,533 B2
(45) Date of Patent: Jun. 20, 2023

(54) METHOD OF ESTIMATING ACTUAL EGR RATIO IN EGR SYSTEM AND EGR SYSTEM (71) Applicant: NISSAN MOTOR CO., LTD., Yokohama (JP)

(72) Inventors: Daisuke Takaki, Kanagawa (JP); Kenji Suzuki, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/627,251

(22) PCT Filed: Nov. 15, 2019

(86) PCT No.: PCT/JP2019/044930
§ 371 (c)(1),
(2) Date: Jan. 14, 2022

(87) PCT Pub. No.: WO2021/095250
PCT Pub. Date: May 20, 2021

(65) Prior Publication Data
US 2022/0260043 A1 Aug. 18, 2022

(51) Int. Cl.
F02D 41/12 (2006.01)
F02D 41/00 (2006.01)
F02M 26/16 (2016.01)
F02M 26/21 (2016.01)

(52) U.S. Cl.
CPC ......... *F02D 41/0072* (2013.01); *F02M 26/16* (2016.02); *F02M 26/21* (2016.02)

(58) Field of Classification Search
CPC ............. F02D 41/0005; F02D 41/0072; F02D 2041/0075; F02M 26/47; F02M 2026/0025
See application file for complete search history.

(56) References Cited

U.S. PATENT DOCUMENTS

2017/0356361 A1* 12/2017 Yamaguchi ............ F02M 26/17
2018/0017001 A1* 1/2018 Ito ........................ F02D 41/0065
2020/0063673 A1* 2/2020 Yoshioka ............ F02D 41/0052

FOREIGN PATENT DOCUMENTS

| EP | 1808591 A2 * | 7/2007 | ......... F02D 41/0065 |
| EP | 3 401 536 A1 | 11/2018 | |
| JP | WO2008153198 A1 * | 8/2010 | |
| JP | 2014-234705 A | 12/2014 | |

* cited by examiner

Primary Examiner — Jonathan R Matthias
(74) Attorney, Agent, or Firm — Foley & Lardner LLP (57) ABSTRACT A controller, in shifting the state of the EGR system from the EGR operating state to the EGR non-operating state at the time of performing the deceleration of the vehicle, calculates a provisional EGR ratio that is a provisional value of the current EGR ratio, estimates the provisional EGR ratio as the actual EGR ratio when a fore-and-aft differential pressure of the EGR valve is equal to or more than a predetermined value, performs correction to make the provisional EGR ratio smaller, and estimates the corrected provisional EGR ratio as the actual EGR ratio when the fore-and-aft differential pressure of the EGR valve is less than the predetermined value.

5 Claims, 5 Drawing Sheets

METHOD OF ESTIMATING ACTUAL EGR RATIO IN EGR SYSTEM AND EGR SYSTEM

TECHNICAL FIELD

The present invention relates to a method of estimating an actual EGR ratio in an EGR system and an EGR system.

BACKGROUND ART

There has been known an exhaust gas recirculation (EGR) system that recirculates a portion of an exhaust gas into an intake passage for acquiring advantages such as the prevention of knocking and the enhancement of mileage by reducing a pumping loss. JP 2014-234705 A discloses a technique where, in such an EGR system, it is possible to prevent the deterioration of combustion generated by a temporary elevation of concentration of an EGR gas when a degree of opening of a throttle valve is decreased at the time of decelerating an internal combustion engine or the like.

In the internal combustion engine provided with such an EGR system, the engine is controlled on the basis of an EGR ratio that is a ratio of an EGR gas to a fresh gas.

SUMMARY OF INVENTION

Further, as an EGR system applicable to an internal combustion engine, there has been known a so-called low-pressure loop EGR system where a portion of an exhaust gas (hereinafter referred to as an EGR gas) is recirculated in an intake passage on an upstream side of a throttle valve.

In such a low-pressure loop EGR system, at an upstream side of a merging point of the intake passage where the intake passage and an EGR passage through which an exhaust gas is recirculated merge with each other, a differential pressure generating valve for regulating a pressure at the merging point is disposed. The differential pressure generating valve generates a negative pressure by narrowing a degree of opening of the differential pressure generating valve.

However, a degree of opening of the differential pressure generating valve cannot be set to an extremely small value from a viewpoint of ensuring an amount of air supplied to the inside of a cylinder of an engine. As a result, for example, in shifting a state of the EGR system from an EGR operating state to an EGR non-operating state at the time of performing the deceleration, when a required EGR ratio (target EGR ratio) becomes extremely small, a required negative pressure cannot be generated by the differential pressure generating valve from the above-mentioned viewpoint of ensuring an amount of air and hence, an actual EGR ratio that is an actual ratio of an EGR gas to fresh air becomes small compared to the target EGR ratio.

The actual EGR ratio is an estimated value, and for example, in a case where an engine control is performed by estimating the target EGR ratio as the actual EGR ratio, in a situation where a required negative pressure is not generated by the above-mentioned differential pressure generating valve, the target EGR ratio and the actual EGR ratio become largely different from each other and hence, there is a concern that an appropriate engine control cannot be performed.

In view of the above-mentioned circumstances, it is an object of the present invention to realize the more accurate estimation of an actual EGR ratio.

According to one aspect of present invention, an EGR system includes: a EGR passage that is branched from an exhaust passage of an internal combustion engine, and merges with an intake passage of the internal combustion engine upstream of a throttle valve that is disposed in the intake passage of the internal combustion engine and controls an amount of intake air into the internal combustion engine; an EGR valve that is disposed in the EGR passage and controls a flow of an exhaust gas returned to the intake passage through the EGR passage; a differential pressure generating valve that is disposed in the intake passage upstream of a merging point where the intake passage merges with the EGR passage, and regulates a pressure at the merging point; and the control unit that is used for controlling an operation of the internal combustion engine, calculates an actual EGR ratio that is a ratio of an amount of a returned exhaust gas to an amount of air in the cylinder of the internal combustion engine, and controls the EGR valve in conformity with a target EGR ratio that is a target value of the actual EGR ratio by gradually lowering the target EGR ratio in shifting a state of the EGR system from an EGR operating state to an EGR non-operating state at the time of performing the deceleration of the vehicle.

A method of estimating an actual EGR ratio in the EGR system includes, in shifting the state of the EGR system from the EGR operating state to the EGR non-operating state at the time of performing the deceleration of the vehicle, calculating a provisional EGR ratio that is a provisional value of the current EGR ratio; estimating the provisional EGR ratio as the actual EGR ratio when a fore-and-aft differential pressure of the EGR valve is equal to or more than a predetermined value; and performing correction to make the provisional EGR ratio smaller and estimating the corrected provisional EGR ratio as the actual EGR ratio when the fore-and-aft differential pressure of the EGR valve is less than the predetermined value.

DESCRIPTION OF EMBODIMENTS

Hereinafter, an embodiment according to the present invention is described with reference to the attached drawings.

Figure 1:
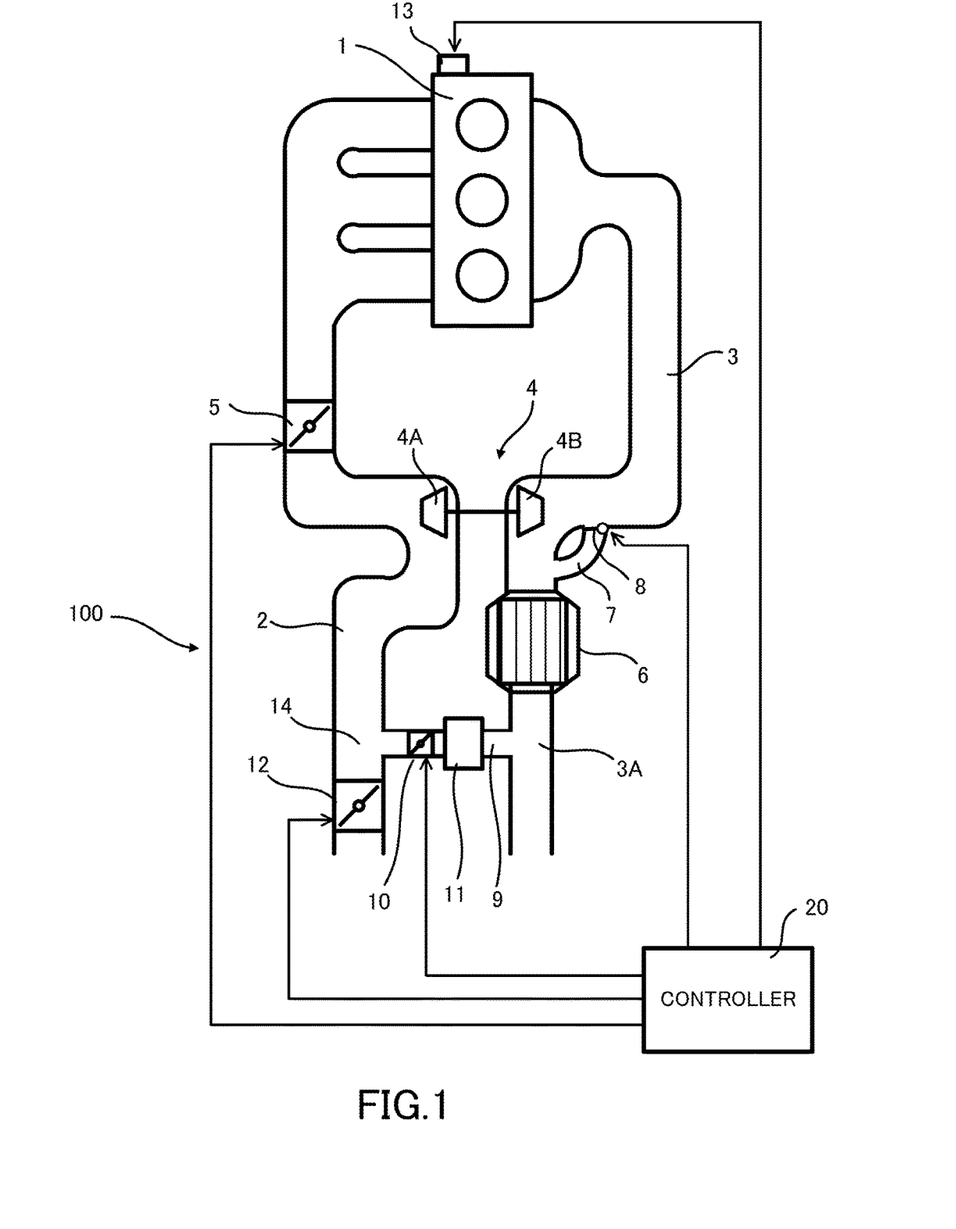
FIG. 1 is a schematic configurational view of an internal combustion engine system.

FIG. 1 is a schematic configurational view of an internal combustion engine system to which an EGR system 100 according to the embodiment is applied.

In an intake passage 2 of an internal combustion engine 1, in order from an upstream side of the intake air flow, an admission valve 12 that serves as a differential pressure generating valve, a compressor 4A of a turbocharger 4, and a throttle valve 5 for regulating an amount of intake air to the internal combustion engine 1 are arranged. The admission valve 12 and the throttle valve 5 are each formed of a valve that is openably and closably driven by an electrically operated motor, and are controlled by a controller 20 described later. FIG. 1 illustrates a case where the admission valve 12 and the throttle valve 5 are each formed of a butterfly valve. However, the admission valve 12 and the throttle valve 5 may be formed of any other type of valve.

In an exhaust passage 3 of the internal combustion engine 1, in order from an upstream side of the exhaust gas flow, a turbine 4B of the turbocharger 4 and an exhaust gas purifying catalyst 6 are arranged. The exhaust gas purifying catalyst 6 is a three-way catalyst, for example.

The exhaust passage 3 includes a bypass passage 7 that allows a portion of the exhaust passage 3 upstream of the turbine 4B and a portion of the exhaust passage 3 downstream of the turbine 4B to communicate with each other. A wastegate valve 8 that opens or closes the bypass passage 7 is disposed on the bypass passage 7. The wastegate valve 8 is a valve that is openably and closably driven by an electrically operated motor, and is controlled by the controller 20 described later. When the wastegate valve 8 is opened, a portion of an exhaust gas bypasses the turbine 4B in order to avoid passing through the turbine 4B. Accordingly, a boost pressure can be regulated by controlling a degree of opening of the wastegate valve 8. That is, in an engine operating region where a boost pressure exceeds an atmospheric pressure and an amount of intake air cannot be controlled by the throttle valve 5, an engine load is controlled by the wastegate valve 8.

In FIG. 1, a swing valve is illustrated as the wastegate valve 8. However, the wastegate valve 8 may be formed of any other type of valve.

The internal combustion engine system according to the embodiment includes the EGR system 100 for recirculating a portion of an exhaust gas into the intake passage 2. Hereinafter, an exhaust gas to be recirculated is also referred to as "EGR gas".

The EGR system 100 includes: an EGR passage 9 that is branched from an exhaust passage 3A downstream of the exhaust gas purifying catalyst 6 and merges with the intake passage 2 upstream of the compressor 4A and downstream of the admission valve 12; an EGR valve 10 that is disposed in the EGR passage 9 and controls the flow of an EGR gas returned to the intake passage 2 through the EGR passage 9; and an EGR cooler 11 that cools the EGR gas passing through the EGR passage 9. The EGR system 100 according to the embodiment is a so-called low-pressure loop EGR system. The EGR valve 10 is a valve that is openably and closably driven by an electrically operated motor, and is controlled by the controller 20 described later. FIG. 1 illustrates the case where the EGR valve 10 is formed of a butterfly valve. However, the EGR valve 10 may be formed of any other type valve. The EGR cooler 11 may be formed of either an air cooling type cooler or a liquid cooling type cooler.

The internal combustion engine 1 includes a valve timing control mechanism 13 for changing valve timing of an intake valve and valve timing of an exhaust valve. A known mechanism may be used as the valve timing control mechanism 13. For example, a mechanism that changes a rotational phase of an intake camshaft with respect to a crankshaft is used as the valve timing control mechanism 13.

The controller 20 sets a fuel injection amount, fuel injection timing, ignition timing, an EGR ratio R and the like on the basis of detected values of a crank angle sensor, an accelerator position (accelerator opening degree) sensor, an intake pressure sensor, an air flow meter, and the like not illustrated in the drawing. Then, on the basis of these set values, the controller 20 performs an open/close control of the admission valve 12, the throttle valve 5, the EGR valve 10, the wastegate valve 8 and performs a valve timing control by operating the valve timing control mechanism 13. In the embodiment, the controller 20 corresponds to a control unit.

Next, an exhaust gas recirculation control (hereinafter referred to as an EGR control) is described.

Figure 2:
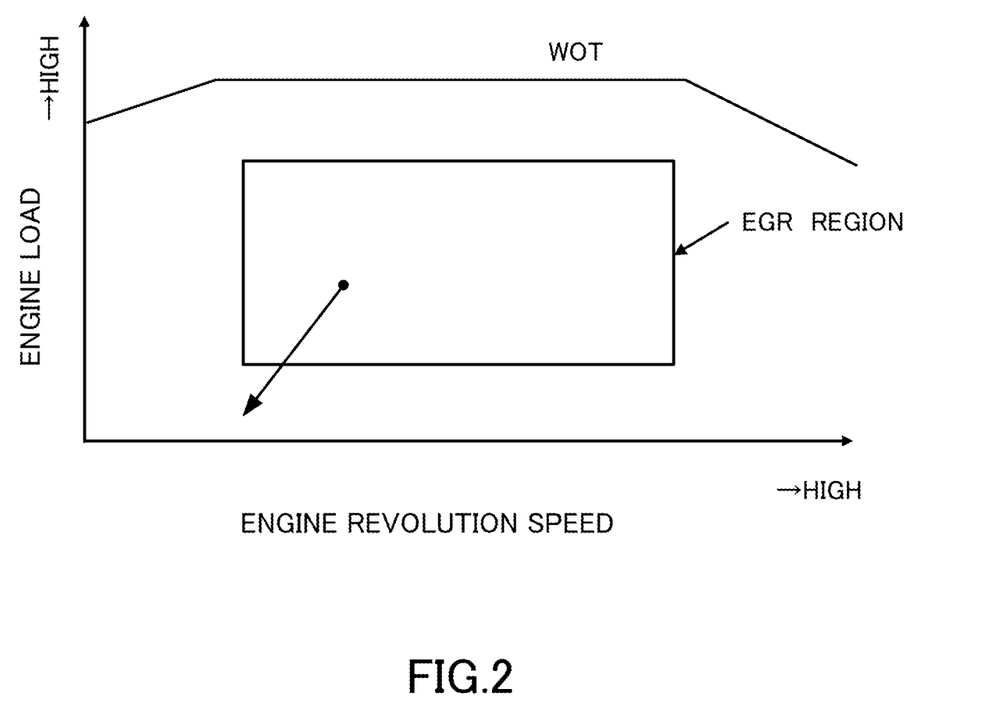
FIG. 2 is an EGR map indicating an EGR ratio for each operation region.

FIG. 2 is an EGR map indicating a driving region where an EGR control is performed and an EGR ratio R. In FIG. 2, an engine revolution speed is taken on an axis of abscissas, and an engine load is taken on an axis of ordinates. The EGR region in the drawing is a region where the EGR control is performed. The EGR ratio R indicates a ratio of an EGR gas amount to a total amount of a fresh gas amount and the EGR gas amount.

The controller 20 reads an engine revolution speed and an engine load as engine operating states, and sets a target EGR ratio Rt that is a target value of an EGR ratio R and a target degree of opening of the admission valve 12 by looking up the map shown in FIG. 2. Then, the controller 20 sets a target opening area of the EGR valve 10 on the basis of the target EGR ratio Rt, and controls a degree of opening of the EGR valve 10 so as to enable the EGR valve 10 to obtain the target opening area. The engine revolution speed is calculated on the basis of a detected value of the crank angle sensor not illustrated in the drawing. The engine load may be calculated on the basis of a detected value of the air flow meter not illustrated in the drawing, or may be calculated on the basis of a detected value of the accelerator position sensor not illustrated in the drawing.

Except for a transition period, described later, where an EGR ratio R changes, the EGR ratio R is controlled on the basis of a degree of opening of the EGR valve 10. The admission valve 12 creates an environment where an EGR ratio R changes corresponding to the degree of opening of the EGR valve 10, and does not directly control the EGR ratio R.

When an engine revolution speed is lowered by turning off an acceleration pedal at the time of performing deceleration, the EGR ratio R gets out from the EGR region as indicated by an arrow in FIG. 2. When the EGR ratio R gets out from the EGR region in this manner, the controller 20 controls the EGR valve 10 and the admission valve 12 so as to gradually lower the EGR ratio R to 0%.

However, a degree of opening of the admission valve 12 cannot be set to an extremely small value from a viewpoint of ensuring an amount of air supplied to the inside of a cylinder of the engine. As a result, when a required EGR ratio R (target EGR ratio Rt) is small, a required negative pressure cannot be generated. Accordingly, a differential pressure $\Delta P$ necessary for realizing the required EGR ratio R (target EGR ratio Rt) cannot be ensured and hence, a flow amount of an exhaust gas that passes through the EGR valve 10 becomes insufficient whereby there is a concern that a current EGR ratio R (an actual EGR ratio Rr) becomes largely different from the target EGR ratio Rt.

In such a situation, in a case where the actual EGR ratio Rr is calculated by estimation, when the actual EGR ratio Rr and the target EGR ratio Rt are largely different from each other, various controls of the internal combustion engine 1 cannot be properly performed. For example, there is a concern that the deterioration of mileage or the like is brought about.

In view of the above-mentioned circumstances, in the embodiment, when a fore-and-aft differential pressure $\Delta P$ for realizing the target EGR ratio Rt cannot be ensured, the actual EGR ratio Rr is estimated to obtain a more appropriate value. Hereinafter, with reference to FIG. 3 and FIG. 4, a method of estimating an actual EGR ratio Rr and an EGR control according to the embodiment are described.

Figure 3:
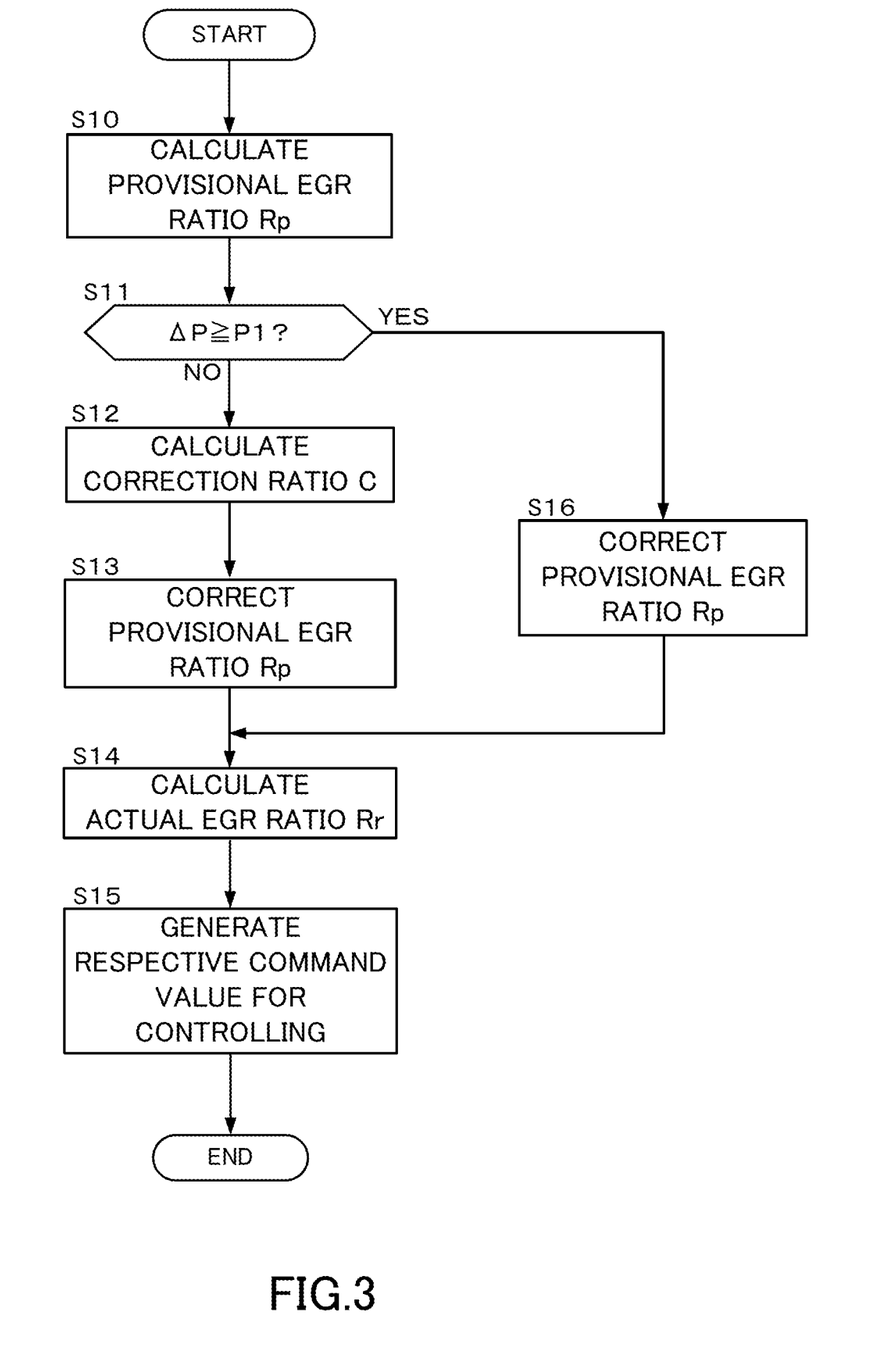
FIG. 3 is a flowchart illustrating an EGR control routine according to an embodiment.
Figure 4:
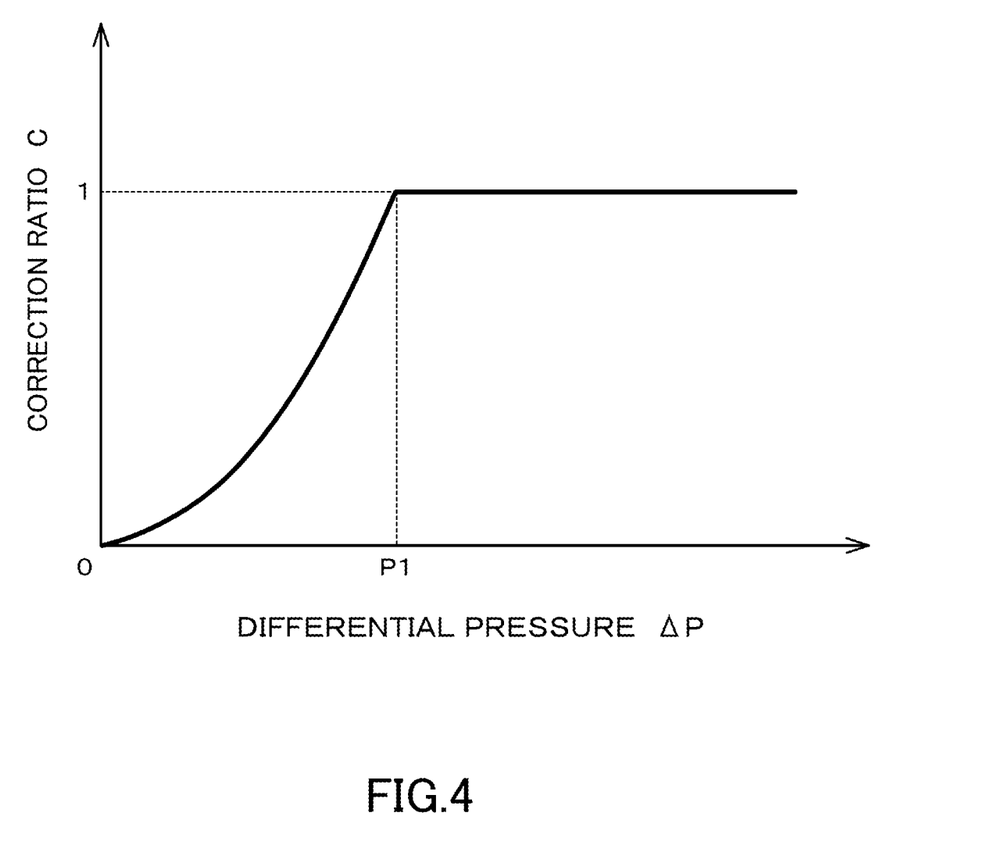
FIG. 4 is a map illustrating a correction ratio according to the embodiment.

FIG. 3 is a flowchart illustrating an EGR control routine that the controller 20 performs. This control routine is programmed in the controller 20 in advance and, for example, the control routine is repeatedly performed at a short interval of approximately 10 ms.

In step S10, the controller 20 calculates a provisional EGR ratio Rp. Specifically, the controller 20 calculates the provisional EGR ratio Rp that is a provisional value of an actual EGR ratio Rr on the basis of a target EGR ratio Rt. In the embodiment, the target EGR ratio Rt is directly calculated as the provisional EGR ratio Rp. However, the provisional EGR ratio Rp may be obtained by correcting the target EGR ratio Rt. Alternatively, the provisional EGR ratio Rp may be calculated using a parameter other than the target EGR ratio Rt.

In step S11, the controller 20 determines whether or not the differential pressure ΔP is equal to or more than a predetermined value P1. Specifically, the controller 20 calculates the differential pressure ΔP on the basis of pressures detected by pressure sensors (not illustrated in the drawings) disposed on an inlet side and an outlet side of the EGR valve 10, and determines whether or not the differential pressure ΔP is equal to or more than the predetermined value P1. When the differential pressure ΔP is less than the predetermined value P1, processing advances to step S12, while when the differential pressure ΔP is equal to or more than the predetermined value P1, processing advances to step S16.

Here, the predetermined value P1 is described. In shifting a state of the EGR system from an EGR operating state to an EGR non-operating state at the time of performing the deceleration of the vehicle, the engine falls within a low-revolution-speed and low-load region and hence, a flow amount of an exhaust gas is decreased and a pressure in the exhaust passage 3 is lowered. Then, when the pressure in the exhaust passage 3 is lowered, the differential pressure ΔP becomes small. The pressure in the exhaust passage 3 and the pressure in the intake passage 2 pulsate and hence, when the differential pressure ΔP becomes small as described above, a magnitude relationship between the pressure in the exhaust passage 3 and the pressure in the intake passage 2 is reversed temporarily so that there is a possibility that air flows backward from the intake passage 2 to the exhaust passage 3.

In such a situation, there is a concern that the target EGR ratio Rt and the actual EGR ratio Rr become largely different from each other. In view of the above, in the embodiment, the differential pressure ΔP described above that generates a backward flow is set as the predetermined value P1 that is a threshold value.

In step S12, the controller 20 calculates a correction ratio C. Specifically, the controller 20 calculates the correction ratio C on the basis of a correction ratio map (see FIG. 4) that indicates a relationship between the differential pressure ΔP and the correction ratio C stored in advance. In the map illustrated in FIG. 4, the correction ratio C is set to a value such that the smaller the differential pressure ΔP at the predetermined value P1 or less, the smaller the correction ratio C becomes.

In step S13, the controller 20 corrects the provisional EGR ratio Rp. Specifically, the controller 20 calculates a corrected provisional EGR ratio Rpa by multiplying the provisional EGR ratio Rp calculated in step S10 by the correction ratio C calculated in step S12. Here, as described above, the correction ratio C is set such that the smaller the differential pressure ΔP, the smaller the correction ratio C becomes and hence, the smaller the differential pressure ΔP, the smaller the corrected provisional EGR ratio Rpa becomes.

In step S14, the controller 20 calculates an actual EGR ratio Rr. Specifically, the controller 20 calculates the corrected provisional EGR ratio Rpa calculated in step S13 as the actual EGR ratio Rr.

In step S15, the controller 20 generates respective command values for controlling the internal combustion engine 1 in the EGR control on the basis of the actual EGR ratio Rr calculated in step S14. Specifically, the controller 20 calculates the respective command values such as a cylinder intake air amount, a throttle opening, valve timing of the valve timing control mechanism 13, an ignition point of time, and a fuel injection amount. Then, the controller 20 controls the internal combustion engine 1 on the basis of these command values. Here, with respect to the EGR valve 10, the controller 20 continues the control performed on the basis of the target EGR ratio Rt.

In step S11, when the controller 20 determines that the differential pressure ΔP is equal to or more than the predetermined value P1, the target EGR ratio Rt and the actual EGR ratio Rr are not different from each other so much and hence, the provisional EGR ratio Rp is directly calculated as the actual EGR ratio Rr without correcting the provisional EGR ratio Rp (step S16).

When the controller 20 performs a fuel cut control by turning off the acceleration, the above-mentioned EGR control is interrupted.

Figure 5:
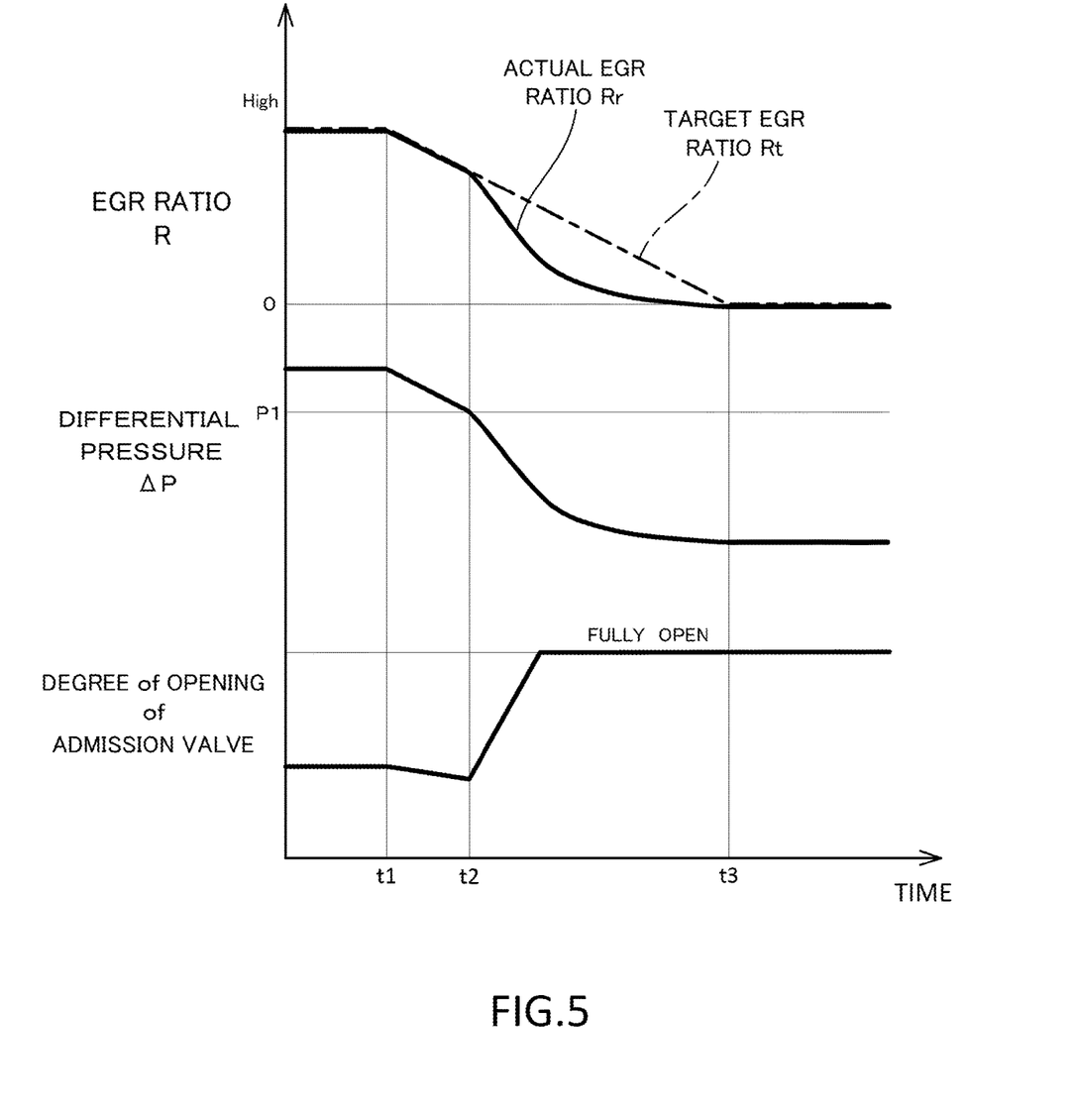
FIG. 5 is one example of a timing chart when an EGR control is performed in the embodiment.

Subsequently, the EGR control according to the embodiment is described more specifically with reference to the time chart illustrated in FIG. 5.

At a point of time t1, for example, when the acceleration pedal is turned off so that an engine load and an engine revolution speed are lowered whereby the target EGR ratio Rt gets out from the EGR region, the controller 20 gradually lowers the target EGR ratio Rt so as to set the actual EGR ratio Rr to 0%. Here, the controller 20 lowers the target EGR ratio Rt at a predetermined decrease ratio indicated by a chained line in FIG. 5. By gradually lowering the target EGR ratio Rt in this manner, a sudden change of the control can be suppressed.

When the engine load and the engine revolution speed are lowered, the differential pressure ΔP is lowered correspondingly to the lowering of the engine load and the engine revolution speed. Here, the controller 20 calculates a provisional EGR ratio Rp from a target EGR ratio Rt and, further, calculates an actual EGR ratio Rr. Then, the controller 20 generates respective command values for controlling the internal combustion engine 1 in an EGR control on the basis of the calculated actual EGR ratio Rr, and controls the respective components of the internal combustion engine 1 on the basis of the generated command values. Here, with respect to the EGR valve 10, the controller 20 continues the control on the basis of the target EGR ratio Rt.

Then, when the differential pressure ΔP is lowered to the predetermined value P1 (at a point of time t2), the controller 20 corrects the provisional EGR ratio Rp. Specifically, the controller 20 calculates a correction ratio C on the basis of the correction ratio map illustrated in FIG. 4. Then, the controller 20 calculates a corrected provisional EGR ratio Rpa by multiplying the provisional EGR ratio Rp by the correction ratio C, and calculates the corrected provisional EGR ratio Rpa as the actual EGR ratio Rr.

Then, the controller 20 generates respective command values for performing an EGR control on respective components of the internal combustion engine 1 on the basis of the actual EGR ratio Rr, and controls the respective components. However, with respect to the EGR valve 10, the controller 20 performs a control on the basis of the target EGR ratio Rt.

Here, the controller 20 fully opens the admission valve 12. In a situation at the point of time t2, the admission valve 12 cannot generate a required negative pressure. Accordingly, by fully opening the admission valve 12, responsiveness when reacceleration is required can be enhanced.

When the target EGR ratio Rt becomes 0% at a point of time t3, the controller 20 finishes the EGR control.

In the EGR control according to the embodiment, in shifting a state of the EGR system from an EGR operating state to an EGR non-operating state at the time of performing the deceleration of the vehicle, when the fore-and-aft differential pressure ΔP of the EGR valve 10 is equal to or more than the predetermined value P1, the controller 20 estimates the provisional EGR ratio Rp as the actual EGR ratio Rr. When the fore-and-aft differential pressure ΔP of the EGR valve 10 is less than the predetermined value P1, the controller 20 calculates the corrected provisional EGR ratio Rpa by performing the correction of the provisional EGR ratio Rp so as to set the provisional EGR ratio Rp small, and estimates the calculated corrected provisional EGR ratio Rpa as the actual EGR ratio Rr.

In shifting a state of the EGR system from an EGR operating state to an EGR non-operating state at the time of performing the deceleration of the vehicle, the engine falls within a low-revolution-speed and low-load region and hence, a flow amount of an exhaust gas is decreased and a pressure in the exhaust passage 3 is lowered. However, at an initial stage of shifting, the pressure in the exhaust passage 3 is not lowered so much and hence, the fore-and-aft differential pressure ΔP of the EGR valve 10 becomes the predetermined value P1 or more. Here, a negative pressure required for generating the differential pressure ΔP for realizing the target EGR ratio Rt can be generated by the admission valve 12. That is, when the fore-and-aft differential pressure ΔP of the EGR valve 10 is equal to or more than the predetermined value P1, the target EGR ratio Rt and the actual EGR ratio Rr are not different from each other so much and hence, the controller 20 can perform the control by estimating the target EGR ratio Rt as the actual EGR ratio Rr.

On the other hand, when a pressure in the exhaust passage 3 is lowered and the fore-and-aft differential pressure ΔP of the EGR valve 10 becomes less than the predetermined value P1, it is not possible for the admission valve 12 to generate a negative pressure necessary for generating the differential pressure ΔP for realizing the target EGR ratio Rt. Accordingly, a magnitude relationship between the pressure in the exhaust passage 3 and the pressure in the intake passage 2 is reversed temporarily so that there is a possibility that air flows backward from the intake passage 2 to the exhaust passage 3. In such a situation, there is a concern that the target EGR ratio Rt and the actual EGR ratio Rr become largely different from each other. That is, when the fore-and-aft differential pressure ΔP of the EGR valve 10 is less than a predetermined value P1, a differential pressure ΔP necessary for realizing the target EGR ratio Rt cannot be ensured and hence, there is a concern that the actual EGR ratio becomes largely different from the target EGR ratio Rt. Accordingly, when the fore-and-aft differential pressure ΔP of the EGR valve 10 is less than the predetermined value P1, the provisional EGR ratio Rp is corrected to take a small value, and the controller 20 performs a control by estimating the provisional EGR ratio Rp that is corrected (corrected provisional EGR ratio Rpa) as the actual EGR ratio Rr. With such processing, the internal combustion engine 1 can be properly controlled.

The configuration, the manner of operation, and the advantageous effects according to the embodiment of the present invention having the above-mentioned configuration are recapitulated hereinafter.

The EGR system 100 includes: the EGR passage 9 that is branched from the exhaust passage 3 of the internal combustion engine 1, and merges with the intake passage 2 of the internal combustion engine 1 upstream of the throttle valve 5 that is disposed in the intake passage 2 of the internal combustion engine 1 and controls an amount of intake air into the internal combustion engine 1; the EGR valve 10 that is disposed in the EGR passage 9 and controls a flow of an exhaust gas returned to the intake passage 2 through the EGR passage 9; the differential pressure generating valve (admission valve 12) that is disposed in the intake passage 2 upstream of a merging point 14 where the intake passage 2 merges with the EGR passage 9, and regulates a pressure at the merging point 14; and the control unit (controller 20) that is used for controlling an operation of the internal combustion engine 1, calculates an actual EGR ratio Rr that is a ratio of an amount of a returned exhaust gas to an amount of air in the cylinder of the internal combustion engine 1, and controls the EGR valve 10 in conformity with a target EGR ratio Rt that is a target value of the actual EGR ratio Rr by gradually lowering the target EGR ratio Rt in shifting a state of the EGR system 100 from an EGR operating state to an EGR non-operating state at the time of performing the deceleration of the vehicle.

In shifting the state of the EGR system 100 from the EGR operating state to the EGR non-operating state at the time of performing the deceleration of the vehicle, the controller 20 (control unit) calculates a provisional EGR ratio Rp that is a provisional value of the current EGR ratio R, and when a fore-and-aft differential pressure ΔP of the EGR valve 10 is equal to or more than a predetermined value P1, the controller 20 estimates the provisional EGR ratio Rp as the actual EGR ratio Rr, and when the fore-and-aft differential pressure ΔP of the EGR valve 10 is less than the predetermined value P1, the controller 20 performs the correction so as to set the provisional EGR ratio Rp small, and estimates the provisional EGR ratio Rp that is corrected (corrected provisional EGR ratio Rpa) as the actual EGR ratio Rr.

In shifting a state of the EGR system from an EGR operating state to an EGR non-operating state at the time of performing the deceleration of the vehicle, the engine falls within a low-revolution-speed and low-load region and hence, a flow amount of an exhaust gas is decreased and a pressure in the exhaust passage 3 is lowered. However, at an initial stage of shifting, the pressure in the exhaust passage 3 is not lowered so much and hence, the fore-and-aft differential pressure ΔP of the EGR valve 10 becomes the predetermined value P1 or more. Here, a negative pressure necessary for generating the differential pressure ΔP for realizing the target EGR ratio Rt can be generated by the differential pressure generating valve (admission valve 12). That is, when the fore-and-aft differential pressure ΔP of the EGR valve 10 is equal to or more than the predetermined value P1, the target EGR ratio Rt and the actual EGR ratio Rr are not different from each other so much and hence, the controller 20 can perform the control by estimating the target EGR ratio Rt as the actual EGR ratio Rr. On the other hand, when a pressure in the exhaust passage 3 is lowered and the fore-and-aft differential pressure ΔP of the EGR valve 10 becomes less than the predetermined value P1, it is not possible for the differential pressure generating valve (admission valve 12) to generate a negative pressure necessary for generating the differential pressure ΔP for realizing the target EGR ratio Rt. That is, when the fore-and-aft differential pressure ΔP of the EGR valve 10 is less than the predetermined value P1, the differential pressure ΔP necessary for realizing the target EGR ratio Rt cannot be ensured and hence, there is a concern that the actual EGR ratio Rr and the target EGR ratio Rt become largely different from each other. Accordingly, the provisional EGR ratio Rp is corrected to take a small value, and the controller 20 performs a control by estimating the provisional EGR ratio Rp that is corrected (corrected provisional EGR ratio Rpa) as the actual EGR ratio Rr. With such processing, the actual EGR ratio Rr can be more accurately estimated and hence, the internal combustion engine 1 can be properly controlled.

The provisional EGR ratio Rp is the target EGR ratio Rt.

By setting the provisional EGR ratio Rp as the target EGR ratio Rt, the calculation of the provisional EGR ratio Rp can be performed easily.

The smaller the fore-and-aft differential pressure ΔP of the EGR valve 10, the smaller a value of the provisional EGR ratio Rp corrected by the controller 20 (control unit) becomes. By performing such correction, the controller 20 can estimate the actual EGR ratio Rr more accurately.

In shifting a state of the EGR system from an EGR operating state to an EGR non-operating state at the time of performing the deceleration of the vehicle, the controller 20 (control unit) fully opens the differential pressure generating valve (admission valve 12) when the fore-and-aft differential pressure ΔP of the EGR valve 10 becomes equal to or less than the predetermined value P1.

By fully opening the differential pressure generating valve (admission valve 12), responsiveness when the reacceleration is required can be enhanced.

Although the description has been made with respect to the embodiment of the present invention, the above-mentioned embodiment merely exemplifies a portion of application examples of the present invention, and it is not intended that the technical scope of the present invention is limited to the specific configuration of the above-mentioned embodiment.

The invention claimed is:

1. A method of estimating an actual EGR ratio in an EGR system that includes:
   an EGR passage that is branched from an exhaust passage of an internal combustion engine, the EGR passage merging with an intake passage of the internal combustion engine at an upstream side of a throttle valve that is disposed in the intake passage and is configured to control an amount of intake air into the internal combustion engine;
   an EGR valve that is disposed in the EGR passage, the EGR valve being configured to control a flow of an exhaust gas returned to the intake passage through the EGR passage;
   a differential pressure generating valve that is disposed in the intake passage at an upstream side of a merging point where the intake passage merges with the EGR passage, the differential pressure generating valve being configured to regulate a pressure at the merging point; and
   a control unit that is configured to calculate an actual EGR ratio that is an estimated value of a current EGR ratio used for controlling an operation of the internal combustion engine, the control unit being configured to control the EGR valve in conformity with a target EGR ratio that is a target value of the actual EGR ratio by gradually lowering the target EGR ratio in shifting a state of the EGR system from an EGR operating state to an EGR non-operating state at the time of performing the deceleration of a vehicle,
   the method comprising, in shifting the state of the EGR system from the EGR operating state to the EGR non-operating state at the time of performing the deceleration of the vehicle:
   calculating a provisional EGR ratio that is a provisional value of the current EGR ratio;
   estimating the provisional EGR ratio as the actual EGR ratio when a fore-and-aft differential pressure of the EGR valve is equal to or more than a predetermined value; and
   performing correction to make the provisional EGR ratio smaller and estimating the corrected provisional EGR ratio as the actual EGR ratio when the fore-and-aft differential pressure of the EGR valve is less than the predetermined value.

2. The method of estimating an actual EGR ratio according to claim 1, wherein the provisional EGR ratio is the target EGR ratio.

3. The method of estimating an actual EGR ratio according to claim 1, further comprising
   correcting the provisional EGR ratio such that the smaller a fore-and-aft differential pressure of the EGR valve, the smaller a value of the provisional EGR ratio becomes.

4. An EGR system comprising:
   an EGR passage that is branched from an exhaust passage of an internal combustion engine, the EGR passage merging with an intake passage of the internal combustion engine at an upstream side of a throttle valve that is disposed in an intake passage and configured to control an amount of intake air into the internal combustion engine;
   an EGR valve that is disposed in the EGR passage, the EGR valve being configured to control a flow of an exhaust gas returned to the intake passage through the EGR passage;
   a differential pressure generating valve that is disposed in the intake passage at an upstream side of a merging point where the intake passage merges with the EGR passage, the differential pressure generating valve being configured to regulate a pressure at the merging point; and
   a control unit that is configured to calculate an actual EGR ratio that is an estimated value of a current EGR ratio used for controlling an operation of the internal combustion engine, the control unit being configured to control the EGR valve in conformity with a target EGR ratio that is a target value of the actual EGR ratio by gradually lowering the target EGR ratio in shifting a state of the EGR system from an EGR operating state to an EGR non-operating state at the time of performing the deceleration of a vehicle,
   wherein
   the control unit is configured such that, in shifting the state of the EGR system from the EGR operating state to the EGR non-operating state at the time of performing the deceleration of the vehicle, the control unit calculates a provisional EGR ratio that is a provisional value of the current EGR ratio, the control unit estimates the provisional EGR ratio as the actual EGR ratio when a fore-and-aft differential pressure of the EGR valve is equal to or more than a predetermined value, and the control unit performs correction to make the provisional EGR ratio smaller, and estimates the corrected provisional EGR ratio as the actual EGR ratio when the fore-and-aft differential pressure of the EGR valve is less than the predetermined value.

5. The EGR system according to claim 4, wherein the control unit, in shifting a state of the EGR system from an EGR operating state to an EGR non-operating state at the time of performing deceleration of the vehicle, fully opens the differential pressure generating valve when the fore-and-aft differential pressure of the EGR valve becomes equal to or less than the predetermined value.

* * * * *